March 10, 1931.  A. R. MEISTER  1,795,731
MOTOR VEHICLE
Filed Feb. 11, 1929  2 Sheets-Sheet 2
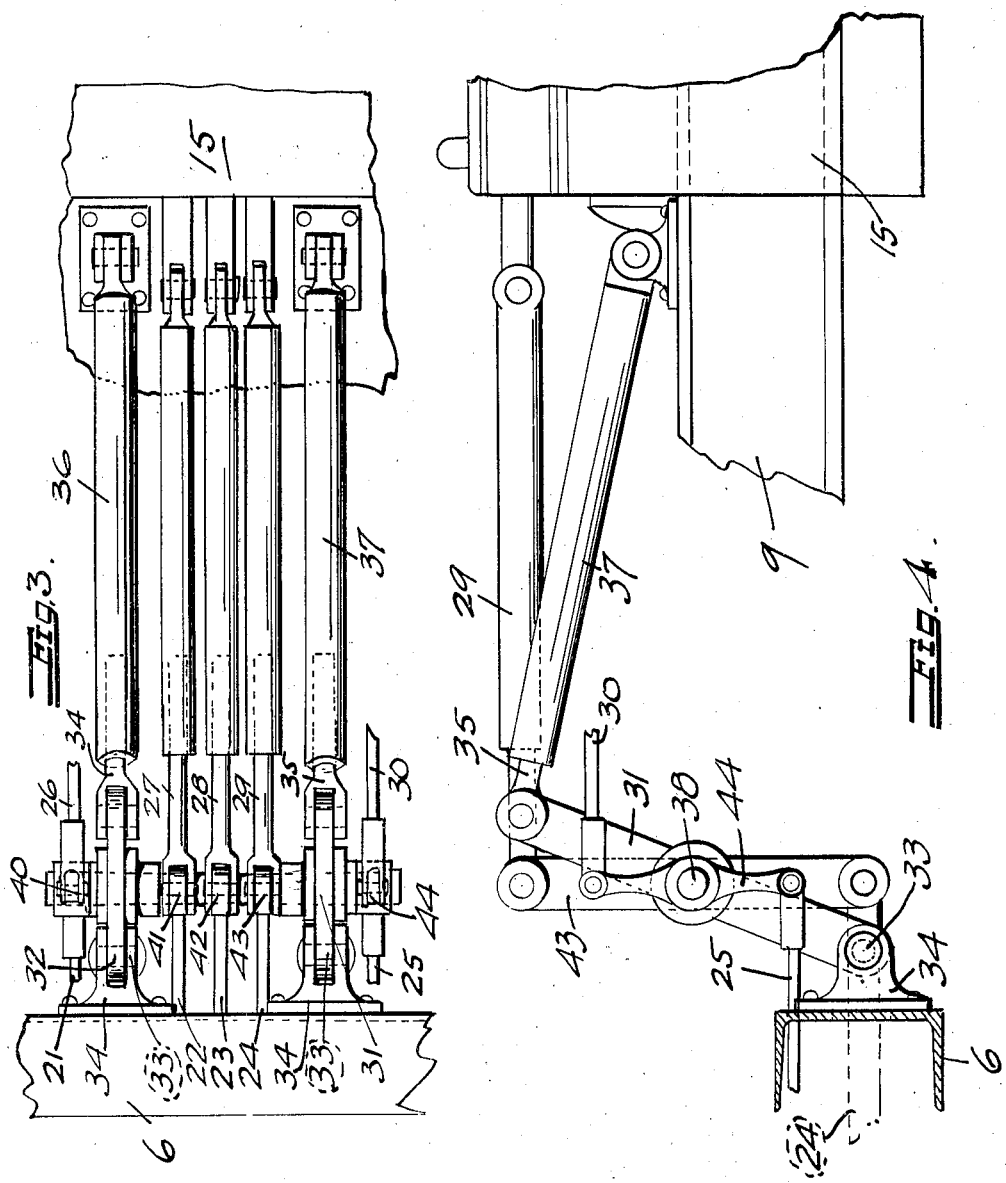
Inventor
Albert. R. Meister.
Attorney Patented Mar. 10, 1931

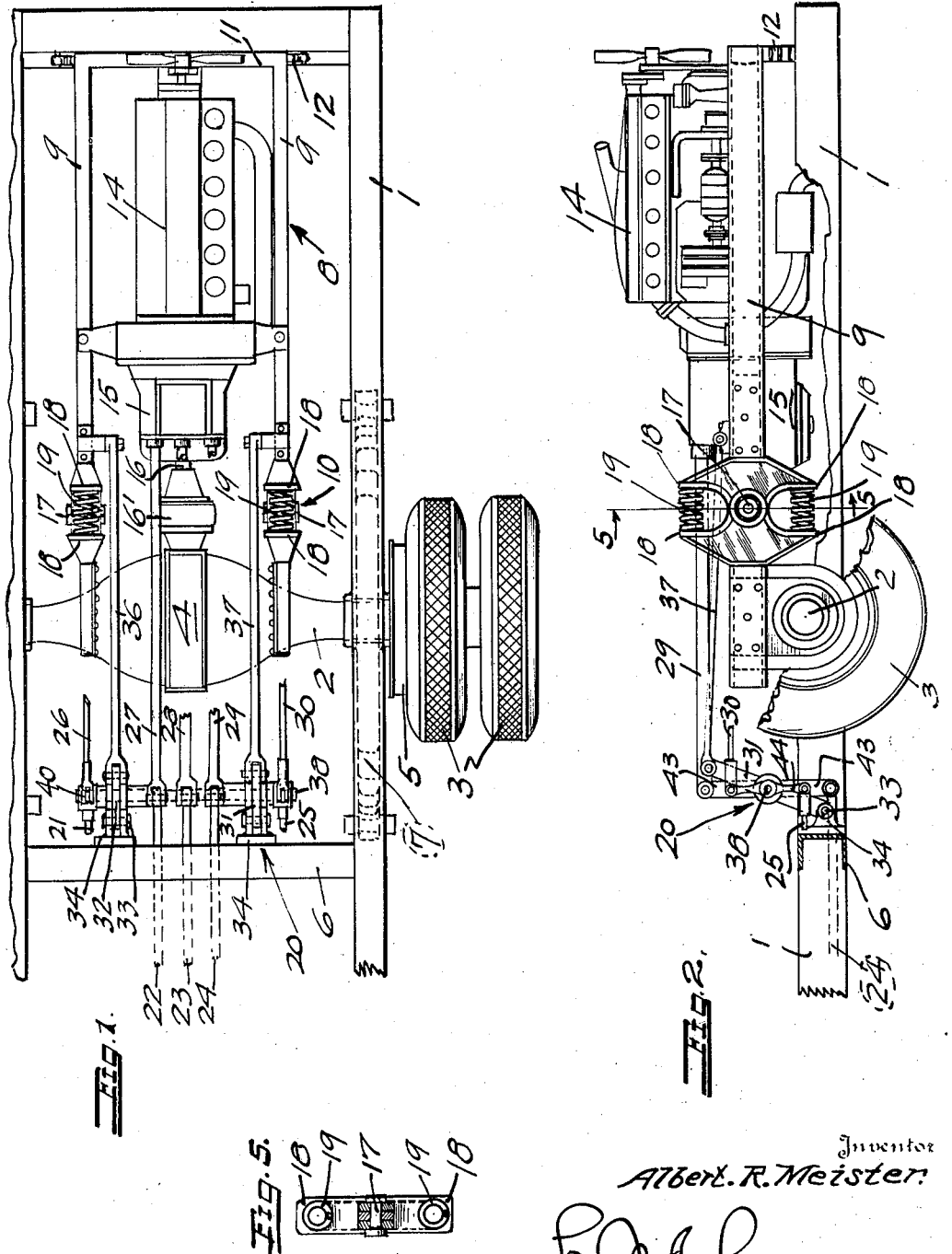

1,795,731

UNITED STATES PATENT OFFICE

ALBERT R. MEISTER, OF SACRAMENTO, CALIFORNIA

MOTOR VEHICLE

Application filed February 11, 1929.   Serial No. 339,221.

This invention relates to improvements in motor vehicles of the type shown in my U. S. patent entitled motor vehicle, No. 1,442,352, issued January 16, 1923, in which an especially constructed sub-frame located rearward of the rear axle and flexibly connected with the main frame, acts as the entire support for the motor and drive unit and provides for a low center of gravity, a greater passenger carrying and floor space, a ready and easy detachability of the motor and drive unit, and an efficient shock absorbing and spring action.

The present invention relates to an improved subframe and mounting therefor which will be more compact, simplified as to construction, sturdy and durable while having all of the above and other advantages as will hereinafter be pointed out.

An important feature of this invention is the provision of a "floating coupling", by means of which the control rods leading from the driver's seat to the flexibly mounted motor and drive unit are maintained at all times in their intended positions of adjustment and will not unintentionally operate the "controls" regardless of the movement of the motor and drive unit, which latter are especially "moved" relative to the main frame when negotiating rough and bumpy roads. In other words, by this arrangement the nearly universal movement permitted the motor and drive unit does not cause the control rods to "lengthen" and "shorten" in a way as would cause the change speed mechanism to unintentionally " shift" or the "throttle" of the motor to be unintentionally operated, because such movement as is caused the control rods when the motor and drive unit are moved relative to the main frame, is effectively dissipated by the "floating coupling", and in no way does said "coupling" interfere with a safe and accurate operation of the control rods from the driver's seat.

A further object is to provide a novel form of shock absorbing and torsion means combined with the sub-frame and arranged to effectively absorb and dissipate shocks and jars transmitted to the sub-frame which means will strengthen the frame unit as well as increase the flexibility of the motor drive unit mounting as a whole.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 is a fragmentary top plan view of a motor vehicle constructed in accordance with this invention, the body of the vehicle being omitted and parts being broken away for clearness of illustration.

Fig. 2 is a fragmentary side elevation of the vehicle structure shown in Fig. 1, and particularly showing the principal features of this invention.

Fig. 3 is an enlarged fragmentary plan view of the "floating coupling" for the control rods.

Fig. 4 is an enlarged view in side elevation of the principal parts of the "floating coupling".

Fig. 5 is a sectional view of the flexible connection of the sub-frame to the rear axle, the section being on the line 5—5 of Fig. 2.

In the present embodiment of my invention, I have shown in the accompanying drawings only such parts of a motor vehicle as are directly associated with the apparatus of the invention, which parts include a chassis or main frame 1, a rear axle 2, wheels 3 on one end of said axle, differential mechanism 4, brake 5 and cross member 6 on said main frame. The rear axle is connected in the usual manner by semi-elliptic springs 7 with the main frame 1.

A sub-frame 8 is connected with the rear axle and main frame and lies rearward of said axle, said sub-frame primarily including spaced parallel frame members 9 fixed at their inner ends to the rear axle by the means 10 and joined at their outer ends by a cross member 11. A transverse laminated spring 12 is secured between its ends to the cross member 11 and suitably shackled at its ends to the main frame, whereby the sub-frame will be flexibly connected with the main frame and will be permitted a substantially universal movement. By this arrangement the main frame may be underslung and the center of gravity of the vehicle considerably lowered. It will thus be seen that the sub-frame lies within the main frame but is spaced from and entirely flexibly connected therewith and disposed rearwardly of the rear axle. This arrangement provides for disposing the "floor" of the vehicle body, not shown, close to the ground and the entire floor area between the axles may be arranged in a common plane and entirely used for seating space.

The motor 14 and drive unit 15 are fixed to the sub-frame and connected by the short shafting 16 and universal joint 16' with the differential mechanism of the rear axle. Thus, the motor and drive unit are flexibly mounted in the vehicle ensemble and located rearward of the rear axle but are free to move as does the rear axle, relative to the main frame.

To prevent transmission of much of the road shocks from the rear axle to the motor and drive unit, and the portion of the sub-frame which supports said unit, said frame has its main frame pieces 9 made in sections pivotally joined as at 17 at points near the rear axle. These sections have upstanding and depending opposed lugs 18 near their pivoted ends between and in engagement with which lugs are mounted helical expansion springs 19. These springs compress incident to movement of the rear axle relative to the main frame and thereby act as shock absorbers and protect the motor and drive unit. By having the motor and drive unit entirely supported in the sub-frame, which latter is flexibly supported, the entire unit can therefore move universally relative to the main frame, and road shocks and jars are therefore effectively taken up before being transmitted to the vehicle frame and body.

The control rods which must be extended from the front end of the vehicle, where the driver's seat is located, to the motor and drive unit at the rear of the vehicle, are coupled to the motor and drive unit through an especially constructed "floating" coupling generally designated 20. This "coupling", mounted on the cross member 6 of said main or vehicle frame and connected with the sub-frame, serves as a "floating" support for the control rods so that no matter what movement is given the sub-frame, the control rods will not move so as to unintentionally operate the control of said motor and drive unit. Were it not for this means, movement of the sub-frame might cause a pull or movement of the control rods such as would move the throttle or shift the change speed mechanism or otherwise cause an unintentional operation of the motor and drive controls.

In the present instance control rods designated 21, 22, 23, 24 and 25 lead from the operating members, not shown, which members are located adjacent to the driver's seat, also not shown. These rods through the "floating coupling" 20 are connected with control rods 26, 27, 28, 29 and 30, which latter are coupled to the brake mechanisms, motor throttle, clutch and change speed mechanisms in the customary manner, and which it is thought unnecessary to illustrate in detail. The floating coupling 20, comprises an upright swinging frame made up of rocker links 31 and 32 pivoted as at 33 to brackets 34 on the cross member 6 of the main frame. At their upper ends these links are pivotally connected with the reduced ends 34 and 35 of bars 36 and 37 in turn pivotally connected with the side bars 9 of the sub-frame 8. A shaft 38 is carried by and between the rocker links 31 and 32 and is horizontally disposed at points approximately midway of the upper and lower ends of said rocker links. Rocker arms 40, 41, 42, 43 and 44 are pivotally mounted centrally of their ends on the shaft 38 and are disposed in upright position respectively with the rods 26, 27, 28, 29 and 30, pivotally connected to the lower ends thereof, and the rods 40, 41, 42, 43 and 44 pivotally connected to the upper ends of said arms.

When the driver operates a control, the movement of the particular rod of the group designated from 26 to 30 inclusive, is transmitted to its associated rod of the group designated from 40 to 44 inclusive, through the rocking of the particular rocking arm associated with the said operated control rods, and the "control" element of the motor or drive mechanism, or brake, as the case may be, is operated in the usual manner. Should the sub-frame 1 move longitudinally or otherwise as the result of a road shock or bump, the bars 36 and 37 will cause the upright links 31 and 32 to rock on their pivots 33 and swing forward or rearward, as the case may be. The shaft 38 moves then as a unit with the links 31 and 32, causing the pivotal movement of the rocker arms 40, 41, 42, 43 and 44 around their respective, pivoted lower ends, whereby movement of the control rods 26, 27, 28, 29 and 30, in unison with the motor and drive, is effected. Thus the unintentional movement of said control rods relatively to the motor and drive is obviated by the compensating adjustment of the position of the shaft 28 in accordance with the rocking movement of the sub-frame 8. At the same time any selected control rod may be properly actuated in the aforedescribed manner, regardless of the position of the shaft 38.

I claim:

1. A motor vehicle including a main frame;

a rear axle; springs joining the frame and rear axle; a sub-frame fixed to said axle and flexibly joined with the main frame; a combined motor and drive unit carried by the sub-frame and operatively associated with the rear axle, said sub-frame being in sections one of which is joined to the axle and the other of which is connected with the main frame; and a flexible coupling between said sections of said sub-frame.

2. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle, said sub-frame being in sections one of which is joined to the axle and the other of which is connected with the main frame; and a flexible coupling between said sections of said sub-frame, which coupling includes springs arranged to compress incident to movement of one section relative to the other.

3. A motor vehicle including a main frame; a rear axle; springs joining the frame and rear axle; a sub-frame fixed with the main frame; a combined motor and drive unit carried by the sub-frame and operatively associated with the rear axle; sectional control rods for operating the motor and drive unit; and a floating coupling supported on the main frame for coupling the complemental sections of the rods together.

4. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; and a floating coupling pivotally mounted on the main frame for coupling the complemental sections of said rods together.

5. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; and a floating coupling for connecting the complemental sections of the respective rods to each other with freedom of adjustment compensating for the movement of the motor and drive unit relatively to the main frame.

6. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; coupling means to connect the complemental sections of the rods to each other; and means mounted between the frame and the sub-frame for adjustably supporting said coupling means to adjust the position of said coupling means and said control rods in accordance with the movement of the motor and drive unit relatively to the main frame.

7. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling for connecting the respective ends of the complemental rod sections; and means mounted on the frame and on the sub-frame for supporting said coupling so as to adjust the same in accordance with the movement of the sub-frame relatively to the main frame.

8. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling pivotally connected to the respective ends of each set of complemental rod sections; and means mounted on the frame and on the sub-frame, for pivotally supporting said coupling and adjusting the position thereof so as to compensate for the movement of the sub-frame relatively to the main frame.

9. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling link pivotally connected to the respective ends of each set of complemental rod sections; and means to pivotally support said links, said means being adapted to change the position of the pivotal support of the links in accordance with the movement of the sub-frame relatively to the main frame.

10. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling link pivotally connected to the respective ends of each set of complemental rod sections; a compensating link mechanism pivotally secured to the main frame, and pivotally supporting said coupling links; and means for connecting said compensating link mechanism to the sub-frame for adjusting the position of the coupling link pivot in accordance with the movement of the sub-frame relatively to the main frame.

11. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling link pivotally connected to the respective ends of each set of complemental rod sections; compensating links each having an end thereof pivotally mounted on the main frame; a pivot supported in said compensating links and extending through said coupling links; a bar pivotally connected at an end thereof to the free end of a compensating link, the other end thereof being pivotally mounted on the sub-frame so as to adjust the position of the coupling link pivot in accordance with the movement of the sub-frame relatively to the main frame.

12. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a floating coupling pivotally mounted on the main frame for coupling the complemental sections of said rods together; and a flexible coupling between said sections of the sub-frame.

13. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling for connecting the respective ends of the complemental rod sections; means mounted on the frame and on the sub-frame for supporting said coupling so as to adjust the same in accordance with the movement of the sub-frame relatively to the main frame; a flexible coupling between said sections of the sub-frame; and springs arranged in said flexible coupling to compress incident to the movement of said sub-frame section relatively to each other.

14. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling link pivotally connected to the respective ends of each set of complemental rod sections; a compensating link mechanism pivotally secured to the main frame and pivotally supporting said coupling links; means for connecting said compensating link mechanism to the sub-frame for adjusting the position of the coupling link pivot in accordance with the movement of the sub-frame relatively to the main frame; a flexible coupling between said sections of the sub-frame; and springs arranged in said flexible coupling to compress incident to the movement of said sub-frame sections relatively to each other.

15. A motor vehicle including a main frame; a rear axle; springs joining the frame and rear axle; a sub-frame fixed to said axle and flexibly joined with the main frame; a combined motor and drive unit carried by the sub-frame and operatively associated with the rear axle; sectional control rods for operating the motor and drive unit; a coupling link pivotally connected to the respective ends of each set of complemental rod sections; compensating links each having an end thereof pivotally mounted on the main frame; a pivot supported in said compensating links and extending through said coupling links; a bar pivotally connected at an end thereof being pivotally mounted on the sub-frame so as to adjust the position of the coupling link pivot in accordance with the movement of the sub-frame relatively to the main frame; a flexible coupling between said sections of the sub-frame; and springs arranged in said flexible coupling to compress incident to the movement of said sub-frame sections relatively to each other.

In testimony whereof, I have hereunto set my hand at Sacramento, California, this 29th day of January, 1929.

ALBERT R. MEISTER.